United States Patent Office 3,118,869
Patented Jan. 21, 1964

3,118,869
WATER-SOLUBLE FIBER REACTIVE DYESTUFFS HAVING TWO CHROMOPHORIC GROUPS AND LINKED TOGETHER THROUGH TRIAZINE OR PYRIMIDINE RINGS
Alistair Howard Berrie, Victor David Poole, and Frederick Andrew Waite, Manchester, England, assignors to Imperial Chemical Industries Limited, London, England, a corporation of Great Britain
No Drawing. Filed June 30, 1961, Ser. No. 120,920
Claims priority, application Great Britain July 14, 1960
1 Claim. (Cl. 260—146)

This invention relates to new dyestuffs and more particularly it relates to new dyestuffs which are valuable for colouring textile materials.

According to the invention there are provided the new dyestuffs of the formula:

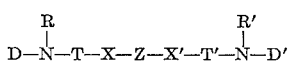

wherein D and D' each represent the residue of a dyestuff molecule and may be the same or different, T and T', which may be the same or different, each represent a 1:3:5-triazine or pyrimidine radical which is attached to the

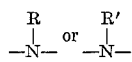

group through a carbon atom of the said radical, R and R' each represent a hydrogen atom or a cycloalkyl radical or a substituted or unsubstituted alkyl radical and may be the same or different, X and X' which may be the same or different each represent —O— or —S— which are attached to carbon atoms in T and T', and Z represents a divalent radical which is attached to the oxygen or sulphur atoms represented by X and X' through the carbon atoms of a

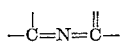

group or of two

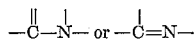

groups present in the radical Z.

Each of the

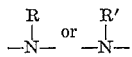

groups is attached to a carbon atom present in D and D'. The said carbon atom may form part of an aryl residue present in D and D' or may form part of an alkyl chain which is directly attached to an aryl residue present in D and D' or is attached to an aryl residue through a bridging atom or group such as —O—, —S—, —NH—,

—CO—, —CONH— and —SO$_2$NH—.

The residues of dyestuff molecules represented by D and D' are the residues of dyestuffs of any known dyestuff series, but preferably they are residues of dyestuffs of the azo, which may be monoazo or polyazo, nitro, anthraquinone or phthalocyanine series, and which preferably contain a water-solubilising group or groups such as a carboxylic acid, alkyl sulphone or sulphamyl group and above all a sulphonic acid group. If desired the dyestuff molecules may also contain coordinately bound metal such as coordinately bound copper, chromium or cobalt.

As examples of the substituted or unsubstituted alkyl radicals represented by R and R' there may be mentioned lower alkyl radicals such as methyl, ethyl, propyl and butyl radicals which may contain substituents such as hydroxy, methoxy and ethoxy groups, and as an example of a cycloalkyl radical represented by R and R' there may be mentioned the cyclohexyl radical.

As examples of the divalent radicals represented by Z which contain a

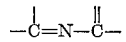

group or two

or

groups there may be mentioned divalent radicals of the following classes:

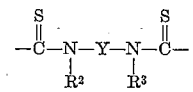

wherein $R^2$ and $R^3$ each represent an alkyl, cycloalkyl, aralkyl or aryl radical and may be the same or different, or $R^2$ and $R^3$ are joined together to form with the group —N—Y—N— a heterocyclic ring, and Y represents a divalent hydrocarbon radical.

As examples of the alkyl radicals represented by $R^2$ and $R^3$ there may be mentioned lower alkyl radicals such as methyl, ethyl, propyl and butyl, as an example of the cycloalkyl radicals represented by $R^2$ and $R^3$ there may be mentioned the cyclohexyl radical, as examples of the aralkyl radicals represented by $R^2$ and $R^3$ there may be mentioned β-phenylethyl and benzyl, and as examples of the aryl radicals represented by $R^2$ and $R^3$ there may be mentioned monocyclic aryl radicals such as phenyl and tolyl. As an example of a heterocyclic ring formed by joining $R^2$, $R^3$ and the group —N—Y—N— there may be mentioned the piperazine ring.

As examples of the divalent hydrocarbon radicals represented by Y there may be mentioned alkylene radicals for example alkylene radicals containing 1 to 6 carbon atoms such as methylene, ethylene, trimethylene, propylene, tetramethylene and α:β-dimethylene, and arylene radicals such as phenylene, diphenylene and naphthylene radicals, and divalent aromatic radicals of the formula:

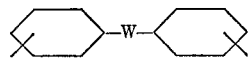

wherein W represents a bridging atom or group such as —O—, —S—, —CO, —SO$_2$—, —SO$_2$NH—, —CH$_2$—, —CONH— and —NHCONH—, and the benzene rings may carry substituents such as chlorine atoms or methyl, methoxy, acylamino, carboxylic acid or sulphonic acid groups.

(b)

wherein Y has the meaning stated above, and $R^4$ and $R^5$ each represent an alkyl, cycloalkyl, aralkyl or aryl radical and may be the same or different. The radicals represented by $R^4$ and $R^5$ are as defined for $R^2$ and $R^3$.

(c)

wherein $R^4$, $R^5$ and Y have the meaning stated above.

(d) Divalent heterocyclic radicals containing a

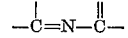

group or wherein the two

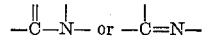

groups form part of the same heterocyclic ring. As examples of such divalent heterocyclic radicals there may be mentioned divalent radicals derived from oxazole, 1:2:4-oxadiazole, 1:3:4-oxadiazole, 1:2:5-oxadiazole, 1:3:4-thiadiazole, pyrazole, iminazole, 1:2:3-triazole, 1:2:4-triazole, 1:3:4-triazole, pyridine, 2-phenyl-1:3:5-triazine, quinoxaline, isoindole, 1:3-oxazine, 1:4-oxazine, pyrimidine, 1:2:4-triazine, tetrazine, oxadiazine, phthalazine and quinazoline.

(e) Divalent heterocyclic radicals which contain at least 2 heterocyclic rings wherein each of the two $$-\overset{\overset{O}{\|}}{C}-\overset{|}{N}- \text{ or } -\overset{|}{C}=N-$$

groups forms part of different heterocyclic rings present in the said radical.

As examples of such divalent heterocyclic radicals there may be mentioned the divalent heterocyclic radicals of the formula:

[structure: -C(Q)=N-ring-X'-ring-N=C(Q)-]

wherein Q represents $$-O-, -S-, -NH-, -\overset{|}{N}alkyl, -CH_2-, -\overset{|}{C}(alkyl)_2$$

or —Se—, and Y′ represents a direct link or a bridging atom or group such as —O—, —S—, —NH—, —SO₂—, —CO—, —NHCO—, NHCONH—, CH₂—,

—CH₂CH₂—

[structure: -CONH-⟨ ⟩-NHCO-, -NHCO-⟨ ⟩-CONH-]

NHCOCH₂CONH—, NHCOCH=CHCONH—,

[structure: triazine ring with HN— and —NH substituents, positions N3 4 5N, 2 1 6]

or

[structure: -C(N-N)=C- with O bridge (oxadiazole)]

and the 4-position of the 1:3:5-triazine ring may carry a substituent.

The divalent heterocyclic radicals of the formulae:

[structures: -C(Q)=N-ring-ring-N=C(Q)- and -C(Q)=N-ring-ring(Q)=C-]

wherein Q has the meaning stated above, and divalent heterocyclic radicals of the formulae:

[structures: four thiadiazole/triazole based divalent radicals with -alkylene- bridges]

[structures: thiazole-based radicals with -(alkylene or arylene)- bridge]

[structures: several fused heterocyclic systems including thiazole-pyrimidine, thiazole-benzoquinone-thiazole, benzothiazole-CH₂CH₂-benzothiazole]

[structure: -triazine-NH-⟨ ⟩-CH=CH-⟨ ⟩(SO₃H)-NH-triazine-]

and

[structure: -[pyrimidine]-NH-⟨ ⟩(SO₃H)-CH=CH-⟨ ⟩(SO₃H)-NH-[pyrimidine]-]

wherein the 4-positions of the 1:3:5-triazine rings or the 5-positions of the pyrimidine rings can carry substituents.

The 1:3:5-triazine ring represented by T or T′ can carry a further substituent attached to the remaining carbon atom of the 1:3:5-triazine ring, or the pyrimidine ring represented by T or T′ can carry one or two further substituents attached to the remaining carbon atom or atoms of the pyrimidine ring. As examples of such substituents there may be mentioned halogen atoms such as chlorine and bromine, mercapto groups, substituted mercapto groups such as methylmercapto, carboxymethylmercapto and phenylmercapto groups, alkyl radicals for example lower alkyl radicals such as methyl and ethyl radicals, aryl radicals such as phenyl and tolyl radicals, hydroxy groups, alkoxy groups such as methoxy, ethoxy, propoxy and butoxy radicals, aryloxy radicals such as phenoxy, sulphophenoxy and chlorophenoxy radicals, cyano and thiocyano groups, carboxy and carbethoxy groups, amino and substituted amino groups such as methylamino, ethylamino, β-hydroxyethylamino, dimethylamino, diethylamino, di(β-hydroxyethyl) amino, anilino, sulphoanilino, disulphoanilino, carboxyanilino and sulphonaphthylamino groups, and sulphonic acid groups.

According to a further feature of the invention there is provided a process for the manufacture of the new dyestuffs, as hereinbefore defined, which comprises reacting 2 molecular proportions of a dyestuff compound of the formula:

$$\text{D}-\overset{\overset{R}{|}}{N}-T^2$$

or 1 molecular proportion of a dyestuff compound of the formula:

$$\text{D}-\overset{\overset{R}{|}}{N}-T^2$$

and 1 molecular proportion of a dyestuff compound of the formula:

$$\text{D}'-\overset{\overset{R'}{|}}{N}-T^3$$

wherein D, D′, R and R′ have the meanings stated above and T² and T³, which may be same or different, each represent a 1:3:5-triazine or pyrimidine radical which carries a chlorine or a bromine atom attached to a carbon atom of the said radical, with one molecular proportion of a compound of the formula: M—X—Z—X'—M, wherein X, X' and Z have the meanings stated above and M represents a hydrogen or metal atom.

As examples of the metal atoms represented by M there may be mentioned alkali metal atoms such as sodium and potassium.

This process of the invention may be conveniently brought about by adding a solution or suspension of the compound of the formula: M—X—Z—X'—M in water, or in a water-miscible organic liquid such as acetone, or in a mixture of water and water-miscible organic liquid, to a solution or suspension of the dyestuff compound or compounds, as hereinbefore defined, in water, or in a water-miscible organic liquid, or in a mixture of water and a water-miscible organic liquid, stirring the resulting mixture, preferably at a temperature between 20° and 95° C., whilst maintaining the pH of the mixture between 7 and 11 by the addition of an acid-binding agent such as sodium carbonate, and filtering off the dyestuff which is precipitated. If desired water and/or sodium chloride can be added to ensure complete precipitation of all the dyestuff.

As examples of compounds of the formula:

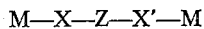

which can be used in this process of the invention there may be mentioned the disodium salt of
2':2''-dimercaptodithiazolo-(4':5'-1:2)(4'':5''-5:4-)benzene,
2':2'''-dimercaptodioxazolo-4'':5''-3:4)(4''':5'''-3':4')-diphenyl,
2'':2'''-dimercaptodiiminazolo-(4'':5''-3:4)(4''':5'''-3':4')diphenyl,
2'':2'''-dimercaptodiselenazolo-(4'':5''-3:4)(4''':5'''-3':4')diphenyl,
2'':2'''-dimercaptodithiazolo-(4'':5''-3:4)(4''':5'''-3':4')-diphenyl(ether - sulphide, -sulphine, -sulphone, -methane, -urea, -amine or ketone),
2:5-dimercapto-1:3:5-oxadiazole,
bis-(2-mercaptobenzthiazol-5-yl),
N:N'-bis-(2-mercaptobenzthiazol-6-yl)-urea,
bis-(2-mercapto-5-sulphobenzthiazol-6-yl),
bis-(2-mercaptobenzoxazol-6-yl),
bis-(2-mercaptobenziminazol-6-yl),
1:2-bis-(2'-mercaptobenzthiazol-5'-yl)-ethane,
2-(3':5'-disulphophenylamino)-4:6-bis-(2''-mercaptobenzthiazol-6'-ylamino)-1:3:5-triazine,
1:4-bis-(2'-mercaptothiazol-4'-yl)-benzene,
1:2-bis-(2'-mercapto-1':3':4'-thiadiazol-5'-yl)-ethane,
2:8-dimercaptopurine, 2':2'''-dimercaptodithiazolo-(4':5'-2:3)(4'':5''-5:6)-1:4-benzoquinone,
4:4'-bis-(2''-mercapto-4''-methoxy-1''':3''':5'''-triazin-6''-ylamino)-stilbene-2:2'-disulphonic acid,
1:4-dimercaptophthalazine,
2:6-dimercaptopyridine,
2:4-dimercapto-6-methylpyrimidine,
2:4-dimercaptoquinazoline,
2:5-dimercapto-1:3:4-thiadiazole,
2:5-bis-(2'-mercaptobenzthiazol-5'-yl)-1:3:4-oxadiazole,
bis-(2-mercaptothiazol-4-yl),
1:2-bis-(2'-mercapto-4'-phenylthiazol-5'-yl)-ethane,
4:4'-bis-(2''-mercaptothiazol-4''-yl)-diphenyl,
2:3-dimercaptoquinoxaline,
1:4-dihydro-3:6-dimercapto-1:2:4:5-tetrazine,
N:N'-dimethyl-N:N'-bis-(dithiocarboxy)-p-phenylenediamine,
1:4-bis-(dithiocarboxy)-piperazine,
dithiooxamide,
dithiosuccindianilide,
dithioadipic acid dianilide and
N:N'-bis-(thioacetyl)-m-phenylenediamine.

The dyestuff compounds of the formula:

or

may themselves be obtained by reacting the appropriate dyestuff compound containing a

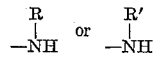

group with a 1:3:5-triazine or pyrimidine containing at least 2 chlorine or bromine atoms.

As examples of 1:3:5-triazines or pyrimidines containing at least 2 chlorine or bromine atoms there may be mentioned cyanuric chloride, cyanuric bromide, 2:4-dichloro-1:3:5-triazine, 2-methyl-4:6 - dichloro - 1:3:5 - triazine, 2-phenyl-4:6-dichloro-1:3:5-triazine, 2-methoxy-4:6-dichloro-1:3:5 - triazine, 2 - methoxy - 4:6 - dibromo-1:3:5-triazine, 2-phenoxy-4:6-dichloro-1:3:5-triazine, 2-amino-4:6-dichloro-1:3:5-triazine, 2-diethylamino-4:6-dichloro-1:3:5-triazine, 2-anilino-4:6-dichloro - 1:3:5 - triazine, 2-(2'-, 3'- or 4'-sulphoanilino)-4:6-dichloro-1:3:5-triazine, 2-(3':5'- or 2':5'-disulphoanilino)-4:6-dichloro-1:3:5-triazine, 2-(3'-carboxyanilino)-4:6-dichloro-1:3:5-triazine, 2:4:6-trichloropyrimidine, 2:4:6-tribromopyrimidine, 2:4:5:6-tetrachloropyrimidine, 2:4:5:6-tetrabromopyrimidine, 2:4:6-trichloro-5-methylpyrimidine, 2:4-dichloro-5-nitropyrimidine, 2:4:6-trichloro - 5 - nitropyrimidine, 2:4-dichloro-5-nitro-6-methylpyrimidine, 2:4:6-trichloro-5-cyanopyrimidine and 2:4:6-trichloro-5-carboethoxypyrimidine.

As examples of dyestuff compounds containing a —NHR or —NHR' group, as hereinbefore defined, there may be mentioned the compounds of the following classes without, however, limiting the classes to those specifically described. In the following classes the symbol "R" is used to denote both "R" and "R'."

(1) Monoazo compounds of the formula:

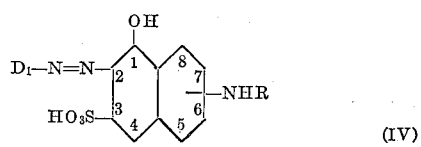

(IV)

wherein $D_1$ represents an at most di-cyclic aryl radical which is free from azo groups and NHR groups, the —NHR group is preferably attached to the 6-, 7- or 8-position of the naphthalene nucleus, and which may contain a sulphonic acid group in the 5- or 6-position of the naphthalene nucleus.

$D_1$ may represent a radical of the naphthalene or benzene series which is free from azo substituents, for example a stilbene, diphenyl, benzthiazolylphenyl or diphenylamine radical. Also in this class are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical, especially those which contain a —$SO_3H$ group in ortho position to the azo link; the phenyl radical may be further substituted for example, by halogen atoms such as chlorine, alkyl radicals such as methyl, acylamino groups such as acetylamino and alkoxy radicals such as methoxy.

(2) Disazo compounds of Formula IV, wherein $D_1$ stands for a radical of the azobenzene, azonaphthalene or phenylazonaphthalene series and the naphthalene nucleus is substituted by the NHR group, and optionally by sulphonic acid as in class 1.

(3) Monoazo compounds of the formula:

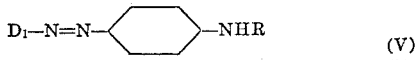

wherein $D_1$ stands for an at most dicyclic aryl radical as described for class 1 and is preferably a disulphonaphthyl or a stilbene radical, and the benzene nucleus may contain further substituents such as halogen atoms, or alkyl, alkoxy, carboxylic acid and acylamino groups.

(4) Mono- or disazo compounds of the formula:

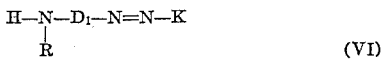

wherein $D_1$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an acetoacetarylide or a 5-pyrazolone) having the OH group o- to the azo group. $D_1$ preferably represents a radical of the benzene series containing a sulphonic acid group.

(5) Mono- or disazo compounds of the formula:

$$D_1—N=N—K_2—NHR \qquad (VII)$$

wherein $D_1$ represents a radical of the types defined for $D_1$ in classes 1 and 2 above and $K_2$ represents the radical of an enolisable ketomethylene compound (such as an acetoacetarylide or a 5-pyrazolone) having the —OH group in $\alpha$-position to the azo group.

(6) The metal complex, e.g. the copper and 1:1-chromium complex, compounds of those dyes of Formulae IV, VI and VII (wherein $D_1$, K and $K_2$ have all the respective meanings stated) which contain a metallisable (for example, a hydroxyl, lower alkoxy or carboxylic acid) group ortho to the azo group in $D_1$.

(7) Anthraquinone compounds of the formula:

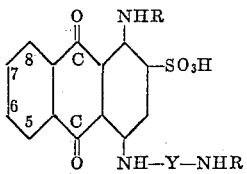

wherein the anthraquinone nucleus may contain an additional halogen atom or sulphonic acid group in the 5-, 6-, 7- or 8-position, and Y represents a bridging group which is preferably a divalent radical of the benzene series, for example phenylene, diphenylene, or 4:4'-divalent stilbene or azobenzene radicals. It is preferred that Y should contain one sulphonic acid group for each benzene ring present.

(8) Phthalocyanine compounds of the formula:

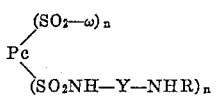

wherein Pc represents the phthalocyanine nucleus preferably of copper phthalocyanine, $\omega$ represents a hydroxy and/or a substituted or unsubstituted amino group, Y represents a bridging group, preferably an aliphatic, cycloaliphatic, araliphatic or aromatic bridging group, $n$ and $m$ each represent 1, 2 or 3 and may be the same or different provided that $n+m$ is not greater than 4.

(9) Nitro dyestuffs of the formula:

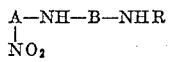

wherein A and B represent monocyclic aryl nuclei, the nitro group in A being ortho to the NH group.

IN CLASS 1

6-amino-1-hydroxy-2-(2'-sulphophenylazo)naphthalene-3-sulphonic acid,
6-methylamino-1-hydroxy-2-(4'-acetylamino-2-sulphophenylazo)naphthalene-3-sulphonic acid,
8-amino-1-hydroxy-2-(2'-sulphophenylazo)naphthalene-3:6-disulphonic acid,
8-amino-1-hydroxy-2-(4'-chloro-2''-sulphophenylazo)-naphthalene-3:5-disulphonic acid,
7-amino-2-(2':5'-disulphophenylazo)-1-hydroxynaphthalene-3-sulphonic acid,
7-methylamino-2-(2'-sulphophenylazo)-1-hydroxynaphthalene-3-sulphonic acid,
7-methylamino-2-(4'-methoxy-2'-sulphophenylazo)-1-hydroxynaphthalene-3-sulphonic acid,
8-(3'-aminobenzoylamino)-1-hydroxy-2-(2'-sulphophenylazo)naphthalene-3:6-disulphonic acid,
8-amino-1-hydroxy-2:2'-azonaphthalene-1':3:5':6-tetrasulphonic acid,
8-amino-1-hydroxy-2:2'-azonaphthalene-1':3:5'-trisulphonic acid,
6-amino-1-hydroxy-2:2'-azonaphthalene-1':3:5'-trisulphonic acid,
6-methylamino-1-hydroxy-2:2'-azonaphthalene-1':3:5'-trisulphonic acid,
7-amino-1-hydroxy-2:2'-azonaphthalene-1':3-disulphonic acid,
8-amino-1-hydroxy-2-(4'-hydroxy-3'-carboxyphenylazo)-naphthalene-3:6-disulphonic acid,
6-amino-1-hydroxy-2-(4'-hydroxy-3'-carboxyphenylazo)-naphthalene-3:5-disulphonic acid.

IN CLASS 2

8-amino-1-hydroxy-2-[4'-(2''-sulphophenylazo)-2'-methoxy-5'-methylphenylazo]naphthalene-3:6-disulphonic acid,
8-amino-1-hydroxy-2-[4'-(4''-methoxyphenylazo)-2'-carboxyphenylazo]naphthalene-3:6-disulphonic acid,
8-amino-1-hydroxy-2-[4'-(2''-hydroxy-3'':6''-disulpho-1''-naphthylazo)-2'-carboxyphenylazo]naphthalene-3:6-disulphonic acid,
4:4'-bis(8''-amino-1''-hydroxy-3'':6''-disulpho-2''-naphthylazo)-3:3'-dimethoxydiphenyl,
6-amino-1-hydroxy-2-[4'-(2''-sulphophenylazo)-2'-methoxy-5'-methylphenylazo]naphthalene-3:5-disulphonic acid.

IN CLASS 3

2-(4'-amino-2'-methylphenylazo)naphthalene-4:8-disulphonic acid,
2-(4'-amino-2'-acetylaminophenylazo)naphthalene-5:7-disulphonic acid,
4-nitro-4'-(4''-methylaminophenylazo)stilbene-2:2'-disulphonic acid,
4-nitro-4'-(4''-amino-2''-methyl-5''-methoxyphenylazo)-stilbene-2:2'-disulphonic acid,
4-amino-4'-(4''-methoxyphenylazo)stilbene-2:2'-disulphonic acid,
4-amino-2-methylazobenzene-2':5'-disulphonic acid.

IN CLASS 4

1-(2':5'-dichloro-4'-sulphophenyl)-3-methyl-4-(3''-amino-4''-sulphophenylazo)-5-pyrazolone,
1-(4'-sulphophenyl)-3-carboxy-4-(4''-amino-3''-sulphophenylazo)-5-pyrazolone,
1-(2'-methyl-5'-sulphophenyl)-3-methyl-4-(4''-amino-3''-sulphophenylazo)-5-pyrazolone,
1-(2'-sulphophenyl)-3-methyl-4-(3''-amino-4''-sulphophenylazo)-5-pyrazolone,
4-amino-4'-(3''-methyl-1''-phenyl-4''-pyrazol-5''-onylazo)-stilbene-2:2'-disulphonic acid,
4-amino-4'-(2''-hydroxy-3'':6''-disulpho-1''-naphthylazo)-stilbene-2:2'-disulphonic acid,
8-acetylamino-1-hydroxy-2-(3'-amino-4'-sulphophenylazo)naphthalene-3:6-disulphonic acid,
7-(3'-sulphophenylamino)-1-hydroxy-2-(4'-amino-2'-carboxyphenylazo)naphthalene-3-sulphonic acid,
8-phenylamino-1-hydroxy-2-(4'-amino-2'-sulphophenylazo)naphthalene-3:6-disulphonic acid, 6-acetylamino-1-hydroxy-2-(5'-amino-2'-sulphophenyl-azo)-naphthalene-3-sulphonic acid.

IN CLASS 5

1-(3'-aminophenyl)-3-methyl-4-(2':5'-disulphophenyl-azo)-5-pyrazolone,
1-(3'-aminophenyl)-3-carboxy-4-(2'-carboxy-4'-sulpho-phenylazo)-5-pyrazolone,
4-amino-4'-[3"-methyl-4"-(2''':5'''-disulphophenylazo)-1"pyrazol-5"-onyl]stilbene-2:2'-disulphonic acid,
1-(3'-aminophenyl)-3-carboxy-4[4"-(2''':5'''-disulpho-phenylazo)-2"-methoxy-5"-methylphenylazo]-5-pyra-zolone.

IN CLASS 6

The copper complex of 8-amino-1-hydroxy-2-(2'-hydroxy-5'-sulphophenylazo)naphthalene-3:6-disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3:5-disulphonic acid,
The copper complex of 8-amino-1-hydroxy-2-(2'-hydroxy-3'-chloro-5'-sulphophenylazo)naphthalene-3:6-disul-phonic acid,
The copper complex of 6-methylamino-1-hydroxy-2-(2'-carboxy-5'-sulphophenylazo)naphthalene-3-sulphonic acid,
The copper complex of 8-amino-1-hydroxy-2-[4'-(2"-sul-phophenylazo)-2'-methoxy-5'-methylphenylazo]-naph-thalene-3:6-disulphonic acid,
The copper complex of 6-amino-1-hydroxy-2-[4'-(2":5"-disulphophenylazo)-2'-methoxy-5'-methylphenylazo]-naphthalene-3:5-disulphonic acid,
The copper complex of 1-(3'-amino-4'-sulphophenyl)-3-methyl-4-[4"-(2''':5'''-disulphophenylazo)-2"-meth-oxy-5"-methylphenylazo]-5-pyrazolone,
The copper complex of 7-(4'-amino-3'-sulphoanilino)-1-hydroxy-2-[4"-(2''':5'''-disulphophenylazo)-2"-meth-oxy-5"-methylphenylazo]naphthalene-3-sulphonic acid,
The copper complex of 6-(4'-amino-3'-sulphoanilino)-1-hydroxy-2-(2"-carboxyphenylazo)naphthalene-3-sul-phonic acid,
The 1:1-chromium complex of 7-amino-6'-nitro-1:2'-di-hydroxy-2:1'-azonaphthalene-3:4'-disulphonic acid,
The 1:1-chromium complex of 6-amino-1-hydroxy-2-(2'-carboxyphenylazo)naphthalene-3-sulphonic acid,
The 1:1-chromium complex of 8-amino-1-hydroxy-2-(4'-nitro-2'-hydroxyphenylazo)naphthalene-3:6-disul-phonic acid,
The 1:1-chromium complex of 1-(3'-amino-4'-sulpho-phenyl)-3-methyl-4-(2"-hydroxy-4"-sulpho-1"-naph-thylazo)-5-pyrazolone,
The 1:1-chromium complex of 7-(4'-sulphoanilino)-1-hy-droxy-2-(4"-amino-2"-carboxyphenylazo)naphthalene-3-sulphonic acid,
The 1:1-chromium complex of 1-(3'-aminophenyl)-3-methyl-4-(4"-nitro-2"-carboxyphenylazo)-5-pyrazo-lone.

IN CLASS 7

1-amino-4-(3'-amino-4'-sulphoanilino)anthraquinone-2-sulphonic acid,
1-amino-4-(4'-amino-3'-sulphoanilino)anthraquinone-2:5-disulphonic acid,
1-amino-4-[4'-(4"-amino-3"-sulphophenyl)anilino]-anthraquinone-2:5-disulphonic acid,
1-amino-4-[4'-(4"-amino-2"-sulphophenylazo)anilino]-anthraquinone-2:5-disulphonic acid,
1-amino-4-(4'-methylamino-3'-sulphoanilino)anthraqui-none-2-sulphonic acid.

IN CLASS 8

3-(3'-amino-4'-sulphophenyl)sulphamyl copper phthalo-cyanine-tri-3-sulphonic acid,
Di-4-(3'-amino-4'-sulphophenyl)sulphamyl copper phthal-ocyanine-di-4-sulphonic acid, 3-(3'-aminophenylsulphamyl)-3-sulphamyl copper phthal-ocyanine-di-3-sulphonic acid.

IN CLASS 9

4-amino-2'-nitro-diphenylamine-3:4'-disulphonic acid.

Specific examples of dyestuff compounds of the formula:

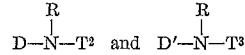

as hereinbefore described, which can be used to obtain the new dyestuffs of the invention are described in British specifications Nos. 209,723, 298,494, 467,815, 503,609, 772,030, 774,925, 785,120, 785,222, 802,935, 803,473, 805,562, 822,047, 822,948, 825,377, 826,405, 828,353, 829,042, 832,400, 833,396, 834,304, 836,248, 836,647, 837,035, 837,124, 837,953, 837,985, 837,990, 838,307, 838,311, 838,335, 838,340, to 838,345, 838,728, 843,985, 844,869, 846,765, 846,949, 847,635, 850,559, 851,537, 852,911, 854,432, 855,792, 859,198, 859,989, 859,990, 863,754, 863,758, 864,227, 866,513 and 867,571, and in Belgian specifications Nos. 573,299, 573,300, 573,301, 578,742, 578,932, 578,933, 581,401, 591,077, 592,747 and 592,748.

According to a further feature of the invention there is provided a modified process for the manufacture of the new dyestuffs, as hereinbefore defined, wherein D and D' are identical, T and T' are identical, R and R' are identical, X and X' are identical and Z represents a radical of the formula:

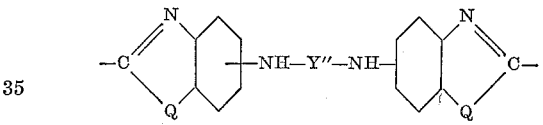

wherein Q has the meaning stated above and Y" represents a —CO— group or the residue of an organic dicarboxylic or disulphonic acid, which comprises reacting 2 molecular proportions of a dyestuff of the formula:

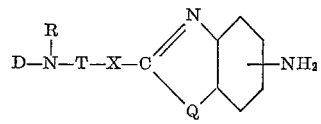

with 1 molecular proportion of phosgene or an acylating agent derived from an organic dicarboxylic or disulphonic acid.

This modified process of the invention may be conveniently brought about by passing phosgene into a solution of the said dyestuff in water and/or in a water-miscible organic liquid, or by adding the acylating agent to a solution of the said dyestuff in water and/or in a water-miscible organic liquid, stirring the resulting mixtures, preferably at temperatures between 20° and 95° C., whilst maintaining the pH's of the mixtures between 7 and 11 by the addition of an alkali such as sodium carbonate or sodium hydroxide, if necessary adding water and/or sodium chloride to precipitate the resulting dyestuff, and filtering off the precipitated dyestuff.

As examples of acylating agents derived from an organic dicarboxylic or disulphonic acid which may be used in this modified process of the invention there may be mentioned acid chlorides or anhydrides of organic dicarboxylic acids for example aliphatic unsaturated dicarboxylic acids such as fumaric acid, aliphatic saturated dicarboxylic acids such as succinic acid, glutaric acid and adipic acid, and aromatic dicarboxylic acids such as terephthalic acid, and acid chlorides of aromatic disulphonic acids such as benzene-m-disulphonic acid and naphthalene-2:6-disulphonic acid.

The dyestuffs used in this modified process of the invention may themselves be obtained by condensing a dyestuff compound of the formula:

$$\overset{R}{\underset{|}{D-N-T^2}}$$

as hereinbefore defined with a compound of the formula:

M—X—C(N,Q)—V wherein M, Q and X have the meanings stated above and V represents a group, such as a nitro or acetylamino group, which can subsequently be converted to an amino group.

According to a further feature of the invention there is provided a modified process for the manufacture of the new dyestuffs of the invention wherein D and D' represent the residues of azo dyestuffs, which comprises tetrazotising an aromatic diamine which contains the group $$\overset{R}{\underset{|}{-N-T-X-Z-X'-T'-N-}}\overset{R'}{\underset{|}{}}$$

wherein R, R', T, T', X, X' and Z have the meanings stated above, and coupling of the tetrazo compound so obtained with 2 molecular proportions of a coupling component, or which comprises diazotising 2 molecular proportions of an aromatic amine and coupling the diazo compound so obtained with one molecular proportion of a coupling component which contains the group $$\overset{R}{\underset{|}{-N-T-X-Z-X'-T'-N-}}\overset{R'}{\underset{|}{}}$$

This modified process of the invention may be conveniently brought about by adding sodium nitrite to a solution or suspension of the aromatic diamine or aromatic amine in a dilute aqueous solution of hydrochloric acid, adding the solution or suspension of the tetrazo or diazo compound so obtained to a solution of the appropriate coupling component, if necessary adding sodium chloride to precipitate the azo dyestuff which is obtained, and filtering off the precipitated dyestuff.

The aromatic diamine or coupling component containing the group $$\overset{R}{\underset{|}{-N-T-X-Z-X'-T'-N-}}\overset{R'}{\underset{|}{}}$$

may be obtained by reacting the appropriate aromatic amine or coupling component containing an $$\overset{R}{\underset{|}{-NH}} \text{ or } \overset{R'}{\underset{|}{-NH}}$$

group with a 1:3:5-triazine or pyrimidine containing 2 chlorine or bromine atoms and subsequently condensing 2 molecular proportions of the resulting compound with 1 molecular proportion of a compound of the formula: M—X—Z—X'—M as hereinbefore defined.

If desired the new dyestuffs, as hereinbefore defined, can be isolated from the medium in which they have been formed and/or subsequently dried in the presence of a buffering agent. As examples of buffering agents which can be used for this purpose there may be mentioned buffering agents derived from phosphates such as sodium dihydrogen phosphate and disodium hydrogen phosphate, citrates such as sodium citrate, borates and alkali metal salts of dialkylmetanilic acid such as sodium diethylmetanilate.

A preferred class of the new dyestuffs of the invention are the dyestuffs of the formula:

$$\overset{R}{\underset{|}{D-N-T-S-Z-S-T-N-D}}\overset{R}{\underset{|}{}}$$

wherein D, R, T, X and Z have the meanings stated above, and in this preferred class D preferably represents the residue of a dyestuff molecule which contains a water-solubilising group or groups such as a carboxylic acid group or groups and above all a sulphonic acid group or groups.

As specific examples of a class of dyestuffs which fall within the preferred class there may be mentioned the dyestuffs of the following formula:

$$D_s-\overset{R}{\underset{|}{N}}-C\overset{N}{\underset{N_5\diagdown_4/}{\overset{1}{\diagup}\overset{}{\searrow}}}{}^1_{3N}2C-S-Z-S-C2\overset{N}{\underset{N3\diagdown_4\diagup}{\overset{1}{\diagup}\overset{}{\searrow}}}{}^1_{5N}6C-\overset{R}{\underset{|}{N}}-D_s$$

wherein R, X and Z have the meanings stated above, $D_s$ represents the residue of a dyestuff molecule which contains at least one water-solubilising group, and the carbon atoms in the 4-positions of the triazine rings can carry a substituent. In this class Z preferably represents one of the following groups:

(a)

$$\overset{S}{\underset{\|}{-C}}-\overset{}{\underset{R^2}{N}}-Y-\overset{}{\underset{R^3}{N}}-\overset{S}{\underset{\|}{C}}-$$

wherein $R^2$, $R^3$ and Y have the meanings stated above, (b)

—C(N,Q)—Y'—C(N,Q)— wherein Q and Y' have the meanings stated above. It is however preferred that Q represents a sulphur atom, and (c)

—C(N,Q)—(N,Q)C— or

—C(N,Q)—(Q,N)C— wherein Q has the meaning stated above. It is however preferred that Q represents a sulphur atom.

The new dyestuff, as hereinbefore defined, are valuable for colouring natural and artificial textile materials for example textile materials comprising cotton, viscose rayon, regenerated cellulose, wool, silk, cellulose acetate, polyamides, polyacrylonitrile, modified polyacrylonitrile, and aromatic polyester fibers. For this purpose the dyestuffs can be applied to the textile materials by dyeing, padding or printing using printing pastes containing the conventional thickening agents or oil-in-water emulsions or water-in-oil emulsions, whereby the textile materials are coloured in bright shades possessing excellent fastness to wet treatments such as washing.

The new dyestuffs which contain water-solubilising groups, for example sulphonic acid and carboxylic acid groups, which render them soluble in water are particularly valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile material is to be subsequently heated or steamed a substance such as sodium bicarbonate or sodium trichloroacetate, which on heating or steaming liberates an acid-binding agent can be used.

For example the cellulose textile material can be coloured by treating the cellulose textile material with an aqueous solution or suspension of the acid-binding agent and then immersing the so-treated cellulose textile material in a dyebath comprising a solution or dispersion of one or more of the new dyestuffs, as hereinbefore defined, at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-binding agent and/or dried before being treated with the aqueous solution or dispersion of the said dyestuffs.

Alternatively the aqueous solution or dispersion of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution or dispersion of one or more of the new dyestuffs, as hereinbefore defined, which also contains an acid-binding agent, passing the so-treated cellulose textile material through rollers, then if desired drying the cellulose textile material at a suitable temperature, for example 70° C., and then subjecting the cellulose textile material to the action of heat or steam. Alternatively the cellulose textile material can be dyed by immersing it in a dyebath comprising an aqueous solution or dispersion of the one or more of the said dyestuffs which also contains an acid-binding agent, at a suitable temperature for example between 0° and 100° C., and thereafter removing the cellulose textile material from the dyebath, if desired subjecting it to a treatment in a hot aqueous solution of soap and finally drying the dyed cellulose textile material. Alternatively the aqueous solution or dispersion of the one or more of the said dyestuffs can be applied to the cellulose textile material by a dyeing or a padding method and the colored cellulose textile material subsequently immersed in an aqueous solution or suspension of the acid-binding agent, preferably at a temperature between 50° C. and 100° C., or alternatively the colored cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution or dispersion of one or more of the said dyestuffs, preferably at a temperature between 20° and 100° C., and, after the textile material has absorbed some or all of the dyestuffs, adding an acid-binding agent and proceeding with the dyeing at the same or a different temperature.

The concentration of the acid-binding agent present in the aqueous solution or suspension or in the aqueous dispersion of the dyestuffs is not critical but it is preferred to use between 0.1% and 10% of the acid-binding agent based on the total weight of the aqueous solution or suspension. If desired the aqueous solution or suspension of the acid-binding agent may also contain further substances, for example electrolytes such as sodium chloride and sodium sulphate.

The aqueous solution or dispersion of the one or more of the said dyestuffs may also contain substances which are known to assist the application of dyestuffs to textile materials, for example sodium chloride, sodium sulphate, urea, dispersing agents, surface-active agents, sodium alginate or an emulsion of an organic liquid, for example trichloroethylene in water.

Alternatively the cellulose textile materials can be printed with a printing paste containing one or more of the new dyestuffs of the invention.

This may be conveniently brought about by applying a printing paste containing one or more of the said dyestuffs, to a cellulose textile material which has been impregnated with an acid-binding agent and thereafter subjecting the printed cellulose textile material to the action of heat or steam. Alternatively a printing paste containing one or more of the said dyestuffs and containing an acid-binding agent can be applied to the cellulose textile material and the printed cellulose textile material subsequently subjected to the action of heat or steam. Alternatively a printing paste containing one or more of the said dyestuffs can be applied to the cellulose textile material which is subsequently immersed in a hot aqueous solution or suspension of the acid-binding agent or alternatively the printed textile material is impregnated with an aqueous solution or suspension of the acid-binding agent and subsequently subjected to the action of heat or steam.

After applying the printing paste to the cellulose textile material the printed textile material may, if desired, be dried, for example at a temperature between 20° and 100° C., before the printed textile material is subjected to the action of heat or steam.

The cellulose textile material may be printed with the printing paste by any of the commonly known methods of applying printing pastes to textile materials, for example by means of roller printing, screen printing, block printing, spray printing or stencil printing. The printing pastes may also contain the commonly used adjuvants, for example urea, thickening agents, for example methyl cellulose, starch, locust bean gum, sodium alginate, water-in-oil emulsions, oil-in-water emulsions, surface-active agents, sodium m-nitrobenzene sulphonate, and organic liquids, for example ethanol.

At the conclusion of the dyeing and/or printing processes it is preferred to subject the so-coloured cellulose textile materials to a "soaping" treatment, which may be carried out by immersing the coloured cellulose textile materials for a short time, for example 15 minutes, in a hot aqueous solution of soap and/or detergent, and subsequently rinsing the coloured cellulose textile material in water before drying it.

Those new dyestuffs which do not contain water-solubilising groups for example sulphonic acid, carboxylic acid, sulphonamide and acylsulphonamide groups are, in general, applied to textile materials in the form of an aqueous dispersion which may be obtained by gravel milling the dyestuff with water in the presence of a dispersing agent, for example the sodium salt of sulphonated naphthalene formaldehyde condensation products, sulphosuccinic acid esters, Turkey red oil, alkyl phenol/ethylene oxide condensation products, soap and similar surface-active materials with or without protective colloids such as dextrin, British gum and water-soluble proteins. If desired the aqueous paste of the dyestuff so obtained may be dried to form a re-dispersible powder which may be converted to a non-dusting powder by any of the processes known for forming non-dusting powders.

The new dyestuffs, as hereinbefore defined, can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethyl-ammonium bromide and cetyl pyridinium bromide and organic liquids such as n-butanol and benzyl alcohol.

When so applied to textile materials the new dyestuffs of the invention give colourations which have excellent fastness to wet treatments.

The new dyestuffs which contain water-solubilising groups are of particular importance for the colouration of cellulose textile materials as the said dyestuffs have excellent affinity for textile materials and the resulting colourations have excellent fastness to wet treatments, such as washing, in that there is little or no staining of any white textile material which is present during the wet treatments. The dyestuffs have much better affinity for cellulose textile materials than the corresponding dyestuffs of the formula:

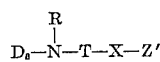

wherein $D_s$, R, T and X have the meanings stated above, and Z′ represents an organic radical such as a heterocyclic radical or a dialkylthiocarbamyl radical.

The invention is illustrated but not limited by the following examples in which the parts are by weight:

*Example 1*

7.16 parts of the trisodium salt of 2-[8′-hydroxy-7′-(2″-sulphophenylazo) - 3′:6′ - disulphonaphth - 1′ - yl-amino]-4:6-dichloro-1:3:5-triazine (which may be obtained as described in Example 4 of British specification No. 785,222) and 1.67 parts of the disodium salt of 2′:2″ - dimercaptodithiazolo(4′:5′ - 1:2)(4″:5″ - 5:4)-benzene (which may be obtained as described in volume 49 of the Journal of the American Chemical Society at page 1755) are dissolved in 150 parts of water and the pH of resulting solution is adjusted to between 8 and 9 by adding a dilute aqueous solution of sodium hydroxide. The solution is then stirred for 45 minutes at a temperature between 30° and 35° C. 30 parts of sodium chloride are then added and the precipitated dyestuff is filtered off. The resulting dyestuff paste is stirred for 1 hour with 250 parts of acetone and the dyestuff is then filtered off. The solid so obtained is mixed with 0.36 part of disodium hydrogen phosphate and 0.64 part of potassium dihydrogen phosphate and is then dried.

On analysis the dyestuff composition so obtained is found to contain 14 atoms of nitrogen and 10 atoms of sulphur per molecule of dyestuff.

When applied to cellulose textile materials in conjunction with a treatment with an acid-binding agent the dyestuff yields bright bluish-red shades which possess excellent fastness to wet treatments.

The following table gives further examples of the new dyestuffs of the invention which are obtained when the 7.16 parts of the trisodium salt of the azo compound used in Example 1 are replaced by equivalent amounts of the sodium salts of the azo compounds which are obtained by condensing the aminoazo compounds listed in the second column of the table with the heterocyclic compounds listed in the third column of the table, and/or the 1.67 parts of the disodium salt of 2′:2″-dimercaptodithiazolo(4′:5′-1:2)(4″:5″-5:4)benzene used in Example 1 are replaced by equivalent amounts of the disodium salt of the mercapto compounds listed in the fourth column of the table, the reaction between the sodium salts of the azo compounds and the mercapto compounds being carried out for the times and at the temperatures stated in the fifth column of the table. The sixth column of the table indicates the shades obtained when the dyestuffs are applied to cellulose textile materials in conjunction with a treatment with an acid-binding agent.

| Example | Aminoazo Compound | Heterocyclic Compound | Mercapto Compound | Conditions of Reaction | Shade |
|---|---|---|---|---|---|
| 2 | 1 - amino - 7 - (2′-sulphophenylazo) - 8 - naphthol - 3:6 - disulphonic acid. | 2:4 - dichloro - 6 - phenylamino - 1:3:5-triazine. | 2′:2″-dimercaptodithiazolo (4′:5′ - 1:2) - (4″:5″ - 5:4)benzene. | 10 hours at 95° C | Red. |
| 3 | 2 - N - methylamino - 6 - (4′- methoxy - 2′- sulphophenylazo) - 5-naphthol-7-sulphonic acid. | 2:4 - dichloro - 6 - methoxy - 1:3:5-triazine. | do | 12 hours at 75° C | Scarlet. |
| 4 | 2 - (2′- acetylamino - 4′- aminophenylazo)naphthalene - 4:8 - disulphonic acid. | 2:4 - dichloro - 6 - amino - 1:3:5-triazine. | do | 12 hours at 95° C | Yellow. |
| 5 | 1 - benzoylamino - 7 - (5′- amino-2′-sulphophenylazo) - 8 - naphthol-3:6-disulphonic acid. | 2:4 - dichloro - 6 - (4′ sulphophenylamino) - 1:3:5 - triazine. | do | 6 hours at 90° C | Bluish-red. |
| 6 | 2 - N - methylamino - 6 - (2′- sulphophenylazo) - 5 - naphthol - 7-sulphonic acid. | 5 - cyano - 2:4:6-trichloropyrimidine. | do | 3 hours at 50° C | Orange. |
| 7 | 2 - (2′- methyl - 4′-aminophenylazo) - naphthalene - 4:8 - disulphonic acid. | 2:4:5:6 - tetrachloropyrimidine | do | 6 hours at 90° C | Yellow. |
| 8 | 1 - (2′:5′- dichloro - 4′- sulphophenyl) - 3 - methyl - 4 - (5″-amino - 2″- sulphophenylazo)-5-pyrazolone. | 2:4:6-trichloropyrimidine | do | 12 hours at 95° C | Greenish-yellow. |
| 9 | do | Cyanuric chloride | do | 2 hours at 35° C | Do. |
| 10 | Copper complex of 1 - amino - 7 - (2′- hydroxy - 3′- chloro - 5′-sulphophenylazo) - 8 - naphthol-3:6-disulphonic acid. | do | do |  | Purple. |
| 11 | 1-(2′:5′-dichloro-4′-sulphophenyl)-3-methyl-4-(5″-amino-2″-sulphophenylazo)-5-pyrazolone. | do | 2:5-dimercapto-1:3:4-thiadiazole. | 2 hours at 35° C | Greenish-yellow. |
| 12 | 1-amino-7-(2′-sulphophenylazo)-8-naphthol-3:6-disulphonic acid. | do | do | 5 hours at 35° C | Red. |
| 13 | do | do | 2:4-dimercapto-6-methylpyrimidine. | ½ hour at 35° C | Do. |
| 14 | 1-(2′:5′-dichloro-4′-sulphophenyl)-3-methyl-4-(5″-amino-2″-sulphophenylazo)-5-pyrazolone. | do | do | 3 hours at 35° C | Greenish-yellow. |
| 15 | do | do | 1:4-bis-(dithio-carboxy)-piperazine. | 2 hours at 35° C | Do. |
| 16 | 2-(2′-methyl-4′-aminophenylazo)-naphthalene-4:8-disulphonic acid. | do | do | 6 hours at 45° C | Yellow. |
| 17 | 1-amino-7-(2′-sulphophenylazo)-8-naphthol-3:6-disulphonic acid. | do | do | 1 hour at 35° C | Red. |

| Example | Aminoazo Compound | Heterocyclic Compound | Mercapto Compound | Conditions of Reaction | Shade |
|---|---|---|---|---|---|
| 18 | 1-(2':5'-dichloro-4'-sulpho-phenyl)-3-methyl-4-(5'-amino-2''-sulphophenylazo)-5-pyrazolone. | Cyanuric chloride | 2''-2'''-dimercapto-dithiazolo-(4'':5''-3:4) (4''':5'''-3':4')-benzophenone. | 1 hour at 35° C | Greenish-yellow. |
| 19 | 2-(2'-methyl-4'-aminophenyl-azo)-naphthalene-4:8-disulphonic acid. | ___do___ | ___do___ | 3 hours at 50° C | Yellow. |
| 20 | 2-amino-6-(2'sulphophenylazo)-5-naphthol-7-sulphonic acid. | ___do___ | ___do___ | 2 hours at 45° C | Orange. |
| 21 | 1-amino-7-(2'-sulphophenylazo)-8-naphthol-3:6-disulphonic acid. | ___do___ | ___do___ | 1 hour at 35° C | Red. |
| 22 | 1-amino-7-(1'-sulphonaphth-2'-ylazo)-8-naphthol-3:6-disulphonic acid. | ___do___ | 2''-2'''-dimercapto-dithiazolo-dithiazolo-(4'':5''-3:4) (4''':5'''-3':4')-benzophenone. | ___do___ | Bluish-red. |
| 23 | Copper complex of 2-amino-6-(2'-hydroxy-5'-sulphophenylazo)-5-naphthol-1:7-disulphonic acid. | ___do___ | ___do___ | 3 hours at 35° C | Rubine. |
| 24 | 2-amino-6-(2'sulphophenylazo)-5-naphthol-7-sulphonic acid. | ___do___ | 2'':2'''-dimercapto-dithiazolo (4'':5''-3:4) (4''':5'''-3':4')-diphenylsulphone. | 4 hours at 35° C | Orange. |
| 25 | 1-(2':5'-dichloro-4'-sulpho-phenyl)-3-methyl-4-(5''-amino-2''-sulphophenylazo)-5-pyrazolone. | ___do___ | ___do___ | 5 hours at 45° C | Greenish-yellow. |
| 26 | ___do___ | ___do___ | 2'':2'''-dimercaptodi-oxazolo (4'':5''-3:4)-(4''':5'''-3':4') diphenyl. | 3 hours at 35° C | Do. |

The 2:5-dimercapto-1:3:4-thiadiazole used in the above examples may be obtained as described in volume 27 of Berichte der Deutschen Chemischen Gesellschaft at page 2518.

The 2:4-dimercapto-6-methylpyrimidine used in the above examples may be obtained as described in volume 32 of Berichte der Deutschen Chemischen Gesellschaft at page 2922.

The 1:4-bis(dithiocarboxy)piperazine may be obtained as described in volume 236 of Comptes Rendus de L'Académie des Sciences at page 931.

The 2'':2'''-dimercaptodithiazolo-(4'':5''-3:4)(4''':5'''-3':4')benzophenone used in the above examples may be obtained as follows:

102 parts of 4:4'-dichloro-3:3'-dinitrobenzophenone are added to a stirred solution of 300 parts of sodium sulphide crystals and 78 parts of sulphur in 240 parts of water at a temperature of 60° C., and the resulting mixture is then stirred for 30 minutes at a temperature between 85° and 90° C. The mixture is cooled to 50° C., 60 parts of carbon disulphide are gradually added and the resulting mixture is stirred for 2 hours at the boil under a reflux condenser. The mixture is then cooled to 50° C., 100 parts of sodium sulphide crystals and 20 parts of carbon disulphide are added, and the mixture is stirred for 3 hours at the boil under a reflux condenser. 700 parts of hot water are then added, the mixture is filtered, the filtrate is cooled to 20° C. and acetic acid added until the mixture is acid to litmus. The precipitated solid is then filtered off and washed with water. The solid is dissolved in 1000 parts of a N aqueous solution of sodium hydroxide, the solution is filtered, the filtrate is acidified with acetic acid, and the precipitated product is filtered off, washed with water and dried.

The 2'':2'''-dimercaptodithiazolo(4'':5''-3:4)(4''':5'''-3': 4')diphenylsulphone used in the above examples may be obtained as follows:

38 parts of 4:4'-dichloro-3:3'-dinitrodiphenylsulphone are added to a stirred solution of 100 parts of sodium sulphide crystals and 26 parts of sulphur in 80 parts of water at a temperature of 50° C., and the resulting mixture is stirred for 15 minutes at 50° C. 20 parts of carbon disulphide are then added and the mixture is then stirred at the boil under a reflux condenser for 3 hours. 600 parts of hot water are then added and the mixture is filtered. The filtrate so obtained is cooled to 20° C. and acidified, to Congo red, with a concentrated aqueous solution of hydrochloric acid. The precipitated solid is then filtered off, washed with water and dried.

The 2'':2'''-dimercaptodioxazolo(4'':5''-3:4)(4''':5'''-3': 4')diphenyl used in the above examples may be obtained as follows:

A mixture of 21.6 parts of 3:3'-dihydroxybenzidine, 250 parts of ethanol, 13 parts of potassium hydroxide and 30 parts of water is stirred at a temperature of 40° C., 17.5 parts of carbon disulphide are added, and the mixture is then stirred at the boil under a reflux condenser for 2 hours. 150 parts of hot water are then added and the resulting mixture is filtered. 25 parts of acetic acid are added to the filtrate and the precipitated solid is filtered off, washed with water and dried.

*Example 27*

20.0 parts of copper phthalocyanine-3-sulphon-N-(4'-amino-3'-sulphophenyl)amide sulphonamide sulphonic acid (which may be obtained as described below) are suspended in 600 parts of water and a 2 N aqueous solution of sodium hydroxide is added until a clear solution is obtained and the pH of the solution is 7. The solution is cooled to 5° C. and a solution of 3.5 parts of cyanuric chloride in 80 parts of acetone is then added. The mixture is stirred for 30 minutes at a temperature of 5° C. whilst maintaining the pH of the mixture between 6 and 6.5 by the addition of a N aqueous solution of sodium hydroxide. A solution of 2.4 parts of 2':2''-dimercapto-dithiazole-(4':5'-1:2)(4'':5''-5:4)benzene in 19 parts of a 2 N aqueous solution of sodium hydroxide is then added and the mixture is slowly heated to a temperature of 25° C., maintained at this temperature for 1 hour, and then heated for 2 hours at a temperature between 35° and 40° C., 160 parts of sodium chloride are then added and the precipitated dyestuff is filtered off and dried.

When applied to cellulose textile materials by a printing process the dyestuff yields bright greenish-blue prints possessing excellent fastness to wet treatments.

The copper phthalocyanine-3-sulphon-N-(4'-amino-3'-sulphophenyl)amide sulphonamide sulphonic acid used in the above example may be obtained as follows:

115.2 parts of copper phthalocyanine are slowly added with stirring to 540 parts of chlorosulphonic acid and the mixture is then stirred for 3 hours at a temperature between 140° and 145° C. The mixture is cooled to 80° C., 100 parts of thionyl chloride are added and the mixture is then stirred for 2 hours at a temperature of 85° C. The mixture is cooled to 20° C., poured on to ice and the precipitated phthalocyanine sulphonchloride is filtered off and washed with 1000 parts of a 1% aqueous solution of hydrochloric acid which has been cooled to 0° C.

The solid sulphonchloride so obtained is stirred with 1000 parts of water and 600 parts of ice and 46 parts of 4-acetylaminoaniline-3-sulphonic acid are then added. The pH of the resultant mixture is adjusted to 8 by the addition of a 2 N aqueous solution of ammonium hydroxide and the temperature of the mixture is then raised to 50° C. during 1 hour, the pH of the mixture being maintained at 8 by further additions of a 2 N aqueous solution of ammonium hydroxide. The mixture is then stirred at a temperature of 50° C. until no further additions of ammonium hydroxide solution are required to maintain the pH at 8. 500 parts of a concentrated aqueous solution of hydrochloric acid are then added and the mixture is stirred for 4 hours at a temperature of 90° C. The mixture is then cooled to 20° C. and the precipitated solid is filtered off, washed with a 1% aqueous solution of hydrochloric acid and dried.

*Example 28*

In place of the solution of 3.5 parts of cyanuric chloride in 80 parts of acetone used in Example 27 there is used a solution of 4.0 parts of 5-cyano-2:4:6-trichloropyrimidine in 80 parts of dioxan when a similar dyestuff is obtained.

*Example 29*

In place of the 2.4 parts of 2':2''-dimercaptodithiazolo-(4':5'-1:2)(4'':5''-5:4)benzene used in Example 27 there are used 1.41 parts of 2:5-dimercapto-1:3:4-thiadiazole or 3.4 parts of 2''':2''''-dimercaptodithiazolo(4'':5''-3:4)-(4''':5'''-3':4')benzophenone when similar dyestuffs are obtained.

*Example 30*

A solution of 3.3 parts of 2':2''-dimercaptodithiazolo-(4':5'-1:2)(4'':5''-5:4)benzene in 26 parts of a N aqueous solution of sodium hydroxide is added with stirring to a solution of 15.0 parts of the disodium salt of 4-(4'':6''-dichloro-1'':3'':5''-triazin-2''-ylamine)-2' - nitrodiphenylamine-3:4'-disulphonic acid (which may be obtained by condensing one molecular proportion of cyanuric chloride with one molecular proportion of the disodium salt of 4-amino-2'-nitrodiphenylamine-3:4'-disulphonic acid) in 450 parts of water and the resulting mixture is stirred for 2 hours at a temperature between 35° and 40° C. 150 parts of potassium chloride are then added and the precipitated dyestuff is filtered off and dried.

On analysis of the dyestuff so obtained is found to contain 14 nitrogen atoms, 8 sulphur atoms and 2 chlorine atoms per molecule of dyestuff.

When applied to cellulose textile materials in conjunction with a treatment with an acid-binding agent the dyestuff yields yellow shades possessing excellent fastness to wet treatments.

*Example 31*

A solution of 15.66 parts of the trisodium salt of 1-amino-4-[4'-(4'':6''-dichloro-1'':3'':5''-triazin - 2''' - ylamino) - anilino]anthraquinone - 2:3':5 - trisulphonic acid (which may be obtained as described in Example 1 of British specification No. 761,930) in 250 parts of water is stirred at 20° C. and a solution of 1.65 parts of 2:5-dimercapto-1:3:4-thiadiazole in a mixture of 11 parts of a N aqueous solution of sodium hydroxide and 30 parts of water is added during 15 minutes. The mixture is stirred at 35° to 40° C. for 3 hours and 45 parts of sodium chloride are then added. The precipitated dyestuff is then filtered off, washed with brine solution and dried at 20° C.

When applied to cellulose textile materials in conjunction with a treatment with an acid-binding agent the dyestuff yields blue shades possessing excellent fastness to wet treatments.

The following table gives further examples of the new dyestuffs of the invention which are obtained when the 1.65 parts of 2:5-dimercapto-1:3:4-thiadiazole used in Example 31 are replaced by equivalent amounts of the mercapto compounds listed in the second column of the table, the reaction being carried out for the times and at the temperatures stated in the third column of the table.

| Example | Mercapto Compound | Conditions of Reaction |
|---|---|---|
| 32 | 2:4-dimercapto-6-methylpyrimidine | 2½ hours at 40° C. |
| 33 | 1:4-bis(dithiocarboxy)-piperazine | 3 hours at 40° C. |
| 34 | 2''':2''''-dimercaptodithiazolo-(4'':5''-3:4)(4''''':5'''''-3':4')benzophenone. | Do. |
| 35 | 2':2''-dimercaptodithiazolo(4':5'-1:2)(4'':5''-5:4)benzene. | Do. |

The following table gives further examples of the new dyestuffs of the invention which are obtained when the 7.16 parts of the trisodium salt of the azo compound used in Example 1 are replaced by equivalent amounts of the sodium salts of the azo compounds which are obtained by condensing the aminoazo compounds listed in the second column of the table with the heterocyclic compounds listed in the third column of the table, and/or the 1.67 parts of the disodium salt of 2':2''-dimercaptodithiazolo-(4':5'-1:2)-(4'':5''-5:4)benzene used in Example 1 are replaced by equivalent amounts of the disodium salt of the mercapto compounds listed in the fourth column of the table, the reaction between the sodium salts of the azo compounds and the mercapto compounds being carried out for the times and at the temperatures stated in the fifth column of the table. The sixth column of the table indicates the shades obtained when the dyestuffs are applied to cellulose textile materials in conjunction with a treatment with an acid-binding agent.

| Example | Aminoazo Compound | Heterocyclic Compound | Mercapto Compound | Reaction Conditions | Shade |
|---|---|---|---|---|---|
| 36 | 1-(4'-sulphophenyl)-3-carboxy-4-(5''-amino-2''-sulphophenylazo)-5-pyrazolone. | Cyanuric chloride | 2':2''-dimercaptodithiazolo-(4':5'-1:2)-(4'':5''-5:4) benzene. | 2 hours at 40° C | Greenish-yellow. |
| 37 | 4-nitro-4'-(4''-methylaminophenylazo)stilbene-2:2'-disulphonic acid. | do | do | do | Yellow. |
| 38 | 1-(4'-sulphophenyl)-3-carboxy-4-(4''-amino-2''-sulphophenylazo)-5-pyrazolone. | do | do | do | Reddish-yellow. |
| 39 | 2-amino-6-(4'-methoxy-2'-sulphophenylazo)-5-naphthol-7-sulphonic acid. | do | do | do | Scarlet. |
| 40 | 2-methylamino-7-(4'-methoxy-2'-sulphophenylazo)-8-naphthol-6-sulphonic acid. | do | do | do | Red. |
| 41 | 1-amino-7-phenylazo-8-naphthol-3:6-disulphonic acid. | do | do | do | Bluish-red. |
| 42 | Copper complex of 2-(4'-amino-3'-sulphophenylamino)-6-(2''-carboxyphenylazo)-5-naphthol-7-sulphonic acid. | do | do | do | Rubine. |
| 43 | 1-amino-7-(4'-hydroxy-3'carboxy phenylazo)-8-naphthol-3:6-disulphonic acid. | do | do | do | Magenta. |
| 44 | Copper complex of 2-amino-6-[2'-hydroxy-5'-methyl-4'-(2'':5''-disulphophenylazo)phenylazo]-5-naphthol-1:7-disulphonic acid. | do | do | do | Blue. |

| Example | Aminoazo Compound | Heterocyclic Compound | Mercapto Compound | Reaction Conditions | Shade |
|---|---|---|---|---|---|
| 45 | Copper complex of 2-(4'-amino-3'-sulphophenyl)-7-[2''-hydroxy-5''-methyl-4''-(2''':5'''-disulphophenylazo)phenylazo]-8-naphthol-6-sulphonic acid. | Cyanuric chloride | 2':2''-dimercaptodithiazolo-(4':5'-1:2)-(4'':5''-5:4) benzene. | 2 hours at 40° C | Grey. |
| 46 | 1-(2':5'-dichloro-4'-sulphophenyl)-3-methyl-4-(5''-amino-2''-sulphophenylazo)-5-pyrazolone. | ___do___ | 2:5-bis(2'-mercaptobenzthiazol-5'-yl)-1:3:4-oxadiazole. | 2 hours at 35° C | Greenish-yellow. |
| 47 | ___do___ | ___do___ | 1:4-dimercaptophthalazine | 6 hours at 35° C | Do. |
| 48 | ___do___ | ___do___ | 2:4-dimercaptoquinazoline | 4 hours at 35° C | Do. |
| 49 | ___do___ | ___do___ | bis(2-mercaptobenziminazol-6-yl) sulphone. | ___do___ | Do. |
| 50 | ___do___ | ___do___ | 1:4-dihydro-3:6 dimercapto-1:2:4:5-tetrazine. | ___do___ | Do. |
| 51 | ___do___ | ___do___ | N:N'-bis(thioacetyl)-m-phenylenediamine. | ___do___ | Do. |
| 52 | 2-methylamino-6-(1':5'-disulphonaphth-2'-ylazo)-5-naphthol-7-sulphonic acid. | 2:4-dichloro-6-amino-1:3:5-triazine. | 2':2''-dimercaptodithiazolo-(4':5'-1:2)-(4'':5''-5:4)-benzene. | 16 hours at 95° C | Orange. |
| 53 | ___do___ | ___do___ | 2'':2'''-dimercaptodithiazolo (4'':5''-3:4)-(4''':5'''-3':4') diphenylsulphone. | ___do___ | Do. |
| 54 | 1-amino-7-(2'-sulphophenylazo)-8-naphthol-3:6-disulphonic acid. | Cyanuric chloride | ___do___ | 2 hours at 35° C | Red. |

*Example 55*

In place of the 2.4 parts of 2':2''-dimercaptodithiazolo-(4':5'-1:2)(4'':5''-5:4)benzene used in Example 27 there are used 1.6 parts of 2:4-dimercapto-6-methylpyrimidine or 1.8 parts of 1:4-bis(dithiocarboxy)piperazine or 2.9 parts of 2'':2'''-dimercaptodioxazolo-(4'':5'''-3:4)(4''':5'''-3':4')diphenyl or 3.8 parts of 2:5-bis-(2-mercaptobenzthiazol-5'-yl)-1:3:4-oxadiazole when similar dyestuffs are obtained.

*Example 56*

In place of the 15.66 parts of the trisodium salt of the anthraquinone compound used in Examples 31 to 35 there are used 13.62 parts of the disodium salt of 1-amino-4-[3'-4'':6''-dichloro-1''':3''':5''-triazin-2'''-ylamino)-anilino]anthraquinone-2:4'-disulphonic acid when dyestuffs are obtained which yield reddish-blue shades, possessing excellent fastness to wet treatments, when the dyestuffs are applied to cellulose textile materials in conjunction with a treatment with an acid-binding agent.

*Example 57*

In place of the 7.16 parts of the trisodium salt of the azo compound used in Example 1 there are used 10.7 parts of the disodium salt of 1-(2':5'-dichloro-4'-sulphophenyl)-3-methyl-4-]5''-(4''':6'''-dichloro-1''':3''':5'''-triazin-2'''-ylamino)-2''-sulphophenylazo]-5-pyrazolone and in place of the 1.67 parts of the disodium salt of 2':2''-dimercaptodithiazolo-(4':5'-1:2)-(4'':5''-5:4)benzene used in Example 1 there are used 0.89 part of the trisodium salt of 2:4:6-trimercapto-1:3:5-triazine, the condensation being carried out for 4 hours at 35° C., whereby a greenish-yellow dyestuff is obtained.

*Example 58*

In place of the 0.89 part o fthe trisodium salt of 2:4:6-trimercapto-1:3:5-triazine used in Example 57 there are used 2.17 parts of the hexasodium salt of 4:4'-bis(2'':4''-dimercapto-1'':3'':5''-triazin-2''-ylamino)stilbene-2:2'-disulphonic acid whereby a greenish-yellow dyestuff is obtained.

*Example 59*

In place of the 7.16 parts of the trisodium salt of the azo compound used sin Example 1 there are used 5.81 parts of the 1:2-chromium complex of 2-(4':6'-dichloro-1':3':5'-triazin-2'-ylamino)-6-(o-carboxyphenylazo)-5-naphthol-7-sulphonic acid, the condensation being carried out for 2 hours at 35° C., whereby a reddish-brown dyestuff is obtained.

*Example 60*

7.16 parts of the trisodium salt of 1-(4':6'-dichloro-1':3':5'-triazin-2'-ylamino)-7-(o-sulphophenyl-azo)-8-naphthol-3:6-disulphonic acid and 2.24 parts of the sodium salt of 6-amino-2-mercaptobenzthiazole (which may be obtained as described in volume 49 of the Journal of the American Chemical Society at page 1780) are dissolved in 150 parts of water, and the pH of the solution is raised to between 8 and 9 by the addition of sodium hydroxide. The solution is stirred for 3 hours at 20° to 25° C., and is then heated to 40° C. and stirred at this temperature while phosgene gas is passed into the solution, the pH of the solution being maintained at 8 by the addition of sodium carbonate, until the reaction is complete and no free amino groups are present. 25 parts of sodium chloride are then added, the mixture is cooled to 20° C. and the dyestuff which is precipitated is filtered off, mixed with 0.36 part of disodium hydrogen phosphate and 0.64 part of potassium dihydrogen phosphate and dried.

On analysis the dyestuff composition so obtained is found to contain 16 atoms of nitrogen and 10 atoms of sulphur per molecule of dyestuff. When applied to cellulose textile materials in conjunction with a treatment with an acid-binding agent the dyestuff yields bluish-red shades which possess excellent fastness to wet treatments.

*Example 61*

A soltuion of 4.4 parts of the sodium salt of 1-[3'-(4'':6''-dichloro-1'':3''':5''-triazin-2''-ylamino)-4'-sulphophenyl]-3-methyl-5-pyrazolone and 1.65 parts of the disodium salt of 2':2''-dimercaptodithiazolo-(4':5'-1:2)-(4'':5''-5:4)-benzene are dissolved in 150 parts of water and sodium hydroxide is added until the pH of the solution is between 8 and 9. The solution is then stirred for 45 minutes at 30° to 35° C., cooled to 5° C., and an aqueous suspension of diazotised orthanilic acid (which is obtained by diazotising 1.5 parts of orthanilic acid by known methods) is added. The resulting mixture is then stirred for 4 hours at 5° C., the pH of the mixture being maintained at 8 by additions of sodium carbonate, 15 parts of sodium chloride are then added and the precipitated dyestuff is filtered off, mixed with 0.36 part of disodium hydrogen phosphate and 0.64 part of potassium dihydrogen phosphate and dried.

On analysis the dyestuff composition so obtained is found to contain 18 nitrogen atoms and 8 sulphur atoms per dyestuff molecule. When applied to cellulose textile materials in conjunction with a treatment with an acid-binding agent the dyestuff yields yellow shades possessing excellent fastness to wet treatments.

The 1:4-dimercaptophthalazine used in the above examples was obtained by the method described in volume 75 of the Journal of the American Chemical Society at page 676.

The N:N'-bis-(thioacetyl)-m-phenylenediamine used in the above examples was obtained by the method described in volume 121 of the Journal of the Chemical Society at page 772.

The 1:4-dihydro-3:6-dimercapto-1:2:4:5-tetrazine used in the above examples was obtained by the method described in volume 125 of the Journal of the Chemical Society at pages 1216 to 1217.

The 2:4-dimercaptoquinazoline, of melting point 313° to 315° C., used in the above examples was obtained by heating a mixture of 2-mercapto-4-hydroxyquinazoline, phosphorus pentasulphide and tetralin at 180° C., cooling, extracting with a dilute aqueous solution of sodium hydroxide, acidifying with acetic acid and crystallising the resulting solid from ethanol.

The bis(2-mercaptobenziminazol-6-yl)sulphone used in the above examples was obtained by stirring a mixture of 17.5 parts of 3:3':4:4'-tetraaminodiphenylsulphone, 8 parts of potassium hydroxide, 100 parts of ethanol, 20 parts of water and 11.4 parts of carbon disulphide for 3 hours at the boil under a reflux condenser, filtering the mixture, adding acetic acid to the filtrate, isolating the precipitated solid and drying the resulting solid.

The 4:4'-bis(4":6"-dimercapto-1":3":5"-triazin-2"-ylamino)stilbene-2:2'-disulphonic acid used in the above examples was obtained as follows:

A solution of 37 parts of the disodium salt of 4:4'-diaminostilbene-2:2'-disulphonic acid in 350 parts of water was added, during 30 minutes, to a stirred suspension of 37 parts of cyanuric chloride in a mixture of 162 parts of acetone, 540 parts of water and 100 parts of ice, and the resulting mixture was then stirred for 1½ hours at 12° C. 100 parts of a 2 N aqueous solution of sodium carbonate were then added, the mixture was cooled to 10° C., and 150 parts of a 25.1% aqueous solution of sodium hydrogen sulphide were added over 2 hours, the temperature of the mixture being allowed to rise to 35° C. The mixture was then stirred for 16 hours at 20° C., then for 1½ hours at 35° C. and finally for 1 hour at 50° C. The mixture was then cooled to 30° C., 140 parts of sodium chloride were added, and the precipitated solid was filtered off and dried.

The 2:4:6-trimercapto-1:3:5-triazine used in the above examples was obtained by the method described in volume 18 of Berichte der Deutschen Chemischen Gesellschaft at page 2201.

What we claim is:

Water-soluble dyestuffs of the formula:

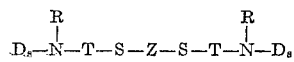

wherein $D_s$ is a water-soluble dyestuffs chromophoric radical selected from the group consisting of anthraquinone, azo, and phthalocyanine dyestuffs chromophoric radicals containing at least one water-solubilizing group selected from carboxylic acid and sulphonic acid groups;

R is selected from the group consisting of hydrogen and lower alkyl;

T represents a divalent heterocyclic ring selected from the class consisting of

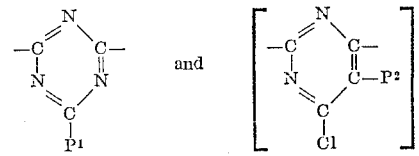

wherein $P^1$ is selected from the class consisting of chlorine, mercapto, lower alkoxy, amino, anilino, and sulphoanilino; and $P^2$ is selected from the class consisting of hydrogen, chlorine, and cyano; and Z represents a divalent radical selected from the class of divalent radicals of the formula:

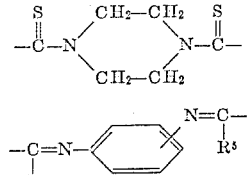

wherein $R^4$ and $R^5$ each represent lower alkyl;

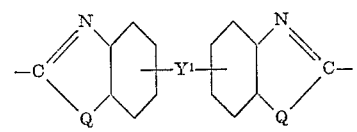

wherein $Y^1$ is selected from the group consisting of a direct link, —$SO_2$—, —CO—, and

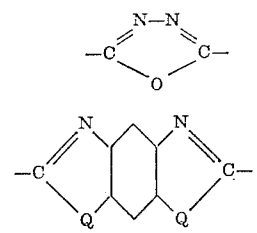

wherein Q is selected from the group consisting of —O—, —S—, and —NH—; and

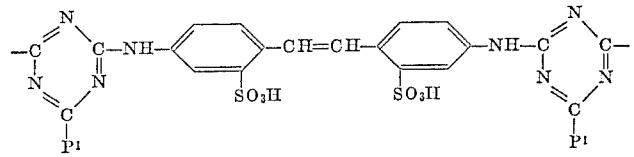

and from the class of divalent heterocyclic radicals consisting of 1:3:4-thiadiazole, pyrimidine, phthalazine, quinazoline, and tetrazine radicals.

References Cited in the file of this patent

UNITED STATES PATENTS 2,763,641    Seitz _____ Sept. 18, 1956